United States Patent
Grafi

(10) Patent No.: US 9,858,424 B1
(45) Date of Patent: Jan. 2, 2018

(54) SYSTEM AND METHOD FOR PROTECTING SYSTEMS FROM ACTIVE CONTENT

(71) Applicant: VOTIRO CYBERSEC LTD., Tel-Aviv (IL)

(72) Inventor: Aviv Grafi, Ramat Gan (IL)

(73) Assignee: VOTIRO CYBERSEC LTD., Tel-Aviv (IL)

( * ) Notice: Subject to any disclaimer, the term of this patent is extended or adjusted under 35 U.S.C. 154(b) by 0 days.

(21) Appl. No.: 15/616,577

(22) Filed: Jun. 7, 2017

Related U.S. Application Data

(60) Provisional application No. 62/442,452, filed on Jan. 5, 2017, provisional application No. 62/450,605, filed on Jan. 26, 2017, provisional application No. 62/473,902, filed on Mar. 20, 2017.

(51) Int. Cl.
*G06F 21/00* (2013.01)
*G06F 21/57* (2013.01)
*G06F 21/10* (2013.01)
*G06F 21/55* (2013.01)

(52) U.S. Cl.
CPC ............ *G06F 21/577* (2013.01); *G06F 21/10* (2013.01); *G06F 21/55* (2013.01)

(58) Field of Classification Search
CPC .............................. G06F 21/577; G06F 21/10
See application file for complete search history.

(56) References Cited

U.S. PATENT DOCUMENTS

| | | | |
|---|---|---|---|
| 4,654,484 A | 3/1987 | Reiffel et al. | |
| 5,164,839 A | 11/1992 | Lang | |
| 6,324,334 B1 | 11/2001 | Morioka et al. | |
| 7,185,017 B1 | 2/2007 | Cauvin et al. | |
| 7,263,561 B1 | 8/2007 | Green et al. | |
| 7,797,743 B2 | 9/2010 | Treacy et al. | |
| 8,180,837 B2 | 5/2012 | Lu et al. | |
| 8,185,954 B2 | 5/2012 | Scales | |
| 8,533,824 B2 | 9/2013 | Hutton | |
| 8,745,742 B1 | 6/2014 | Satish et al. | |
| 8,763,128 B2 | 6/2014 | Lim et al. | |
| 8,869,283 B2 | 10/2014 | Scales | |
| 9,038,174 B2 | 5/2015 | Hutton | |
| 9,047,293 B2 | 6/2015 | Grafi et al. | |
| 9,195,636 B2 * | 11/2015 | Smith | G06F 17/212 |
| 9,301,128 B2 * | 3/2016 | Roundtree | G06F 9/45512 |

(Continued)

FOREIGN PATENT DOCUMENTS

WO WO 2011014623 2/2011

*Primary Examiner* — Ali Shayanfar
(74) *Attorney, Agent, or Firm* — Finnegan, Henderson, Farabow, Garrett & Dunner LLP

(57) ABSTRACT

The disclosed embodiments include a method of disarming active content in a received input file in a computer system having a processor. The method includes steps for identifying from digital content of the input file, targeted active content associated with an automatically invoked subroutine, altering the automatically invoked subroutine to prevent automatic execution of the instructions associated with the subroutine upon rendering by a rendering application, such that functionality of the targeted active content is preserved, and configuring the input file to include a selectable feature enabling a user to invoke the targeted active content responsive to a user input, thereby creating a reconfigured input file.

20 Claims, 6 Drawing Sheets

(56) References Cited

U.S. PATENT DOCUMENTS

| | | | |
|---|---|---|---|
| 9,330,264 | B1 | 5/2016 | Hutton |
| 9,342,521 | B2* | 5/2016 | Isobe ................. G06F 17/30067 |
| 9,516,045 | B2 | 12/2016 | Scales |
| 2003/0229810 | A1 | 12/2003 | Bango |
| 2005/0257045 | A1 | 11/2005 | Bushman et al. |
| 2006/0149735 | A1* | 7/2006 | DeBie ................. G06F 11/1456 |
| 2007/0056035 | A1 | 3/2007 | Copley |
| 2007/0087766 | A1 | 4/2007 | Hardy et al. |
| 2008/0086506 | A1* | 4/2008 | DeBie ..................... H04L 51/30 |
| 2008/0209551 | A1 | 8/2008 | Treacy et al. |
| 2009/0150419 | A1 | 6/2009 | Kim et al. |
| 2009/0282484 | A1 | 11/2009 | Wiseman et al. |
| 2010/0115620 | A1 | 5/2010 | Alme |
| 2010/0223366 | A1* | 9/2010 | Ebreo ....................... G06F 9/50 |
| | | | 709/222 |
| 2012/0110626 | A1* | 5/2012 | Wendelrup ........ G06F 17/30781 |
| | | | 725/93 |
| 2012/0167206 | A1 | 6/2012 | Reetz-Lamour et al. |
| 2013/0081065 | A1 | 3/2013 | Sharan et al. |
| 2016/0065571 | A1* | 3/2016 | Hoyos ................. H04L 63/0861 |
| | | | 713/168 |
| 2016/0191531 | A1 | 6/2016 | Perlmutter et al. |
| 2016/0313896 | A1* | 10/2016 | Liang ................... G06F 3/04842 |
| 2017/0039168 | A1* | 2/2017 | Hassan .................. G06F 17/212 |
| 2017/0098065 | A1* | 4/2017 | Vaughn ................. G06F 21/316 |

* cited by examiner

SYSTEM AND METHOD FOR PROTECTING SYSTEMS FROM ACTIVE CONTENT

PRIORITY CLAIM

This disclosure claims priority under 35 U.S.C. §119 to U.S. provisional patent application No. 62/442,452, filed on Jan. 5, 2017, U.S. provisional patent application No. 62/450,605 filed on Jan. 26, 2017, and U.S. provisional patent application No. 62/473,902 filed on Mar. 20, 2017. Each of the aforementioned applications is incorporated herein by reference in its entirety.

BACKGROUND

Attackers are known to use active content embedded in a document, file, email or other communication to execute malicious code or enable other malicious activity on a victim's computer. Active content may include any content embedded in an electronic file or document or email and configured to carry out an action or trigger an action. Common forms of active content include word processing and spreadsheet macros, formulas, or scripts, JavaScript code within Portable Document Format (PDF) documents, web pages including plugins, applets or other executable content, browser or application toolbars and extensions, etc. Some malicious active content can be automatically invoked to perform the intended malicious functions when a computer runs a program or application to render (e.g., open or read) the received content, such as a file or document. One such example includes the use of a macro embedded in a spreadsheet, where the macro is configured to be automatically executed to take control of the victimized computer upon the user opening the spreadsheet, without any additional action by the user. Active content used by hackers may also be invoked responsive to some other action taken by a user or computer process. The present disclosure is directed to solving problems rooted in the use of embedded active content generally, without regard to how the active content is invoked and executed.

Techniques have been implemented to mitigate the risks posed by active content embedded in electronic documents. One common data sanitization or content disarm and reconstruction (CDR) technique includes removing any detected forms of active content from a document or other received content before it is passed to an intended recipient or otherwise rendered. Similarly, instead of removing the active content, some known techniques change the active content in a way that renders it useless. While such a technique may be successful to prevent malicious functions resulting from execution of the active content, some enterprises may rely heavily on the useful functionality that is intended for non-malicious active content. Indeed, for some enterprises, spreadsheet application macros can provide significant benefits that should not be so indiscriminately discarded. Thus, for some enterprises the wholesale removal or destruction of any and all active content from received documents is not a satisfactory solution.

Other techniques include application-based solutions that include user-configurable settings or default settings within a rendering application that control how or whether active content in a document may be disarmed or otherwise prevented from executing. These solutions, however, may be difficult to configure and manage for an enterprise including many users, and moreover, also suffer from the similar difficulties to those described above in that some active content may be beneficial to the end user such that it is undesirable to categorically block all active content from execution. These solutions may also require cumbersome steps on the part of the user to override the default settings or otherwise enable the active content in order to reap the benefits of legitimate active content, an inconvenience that is not a satisfactory solution. Other application-based solutions are known to temporarily prevent the execution of any active content that may be embedded in a document. For example, Microsoft® includes a "protected view" feature in Word® that enables a user to open the document in a protected environment, such as a "sandbox," to view only the passive content while macros and any other active content are disabled or prevented from executing. The "protected view" environment has limitations though in that a user is unable to edit the document unless he exits the protected environment. Upon doing so, however, the user may be exposed to malicious active content. The "protected view" feature may provide a warning to the user that exiting the "protected view" could expose the user to such risks, but such a warning is often ignored due to a need or desire to edit or otherwise interact with the document in a way that is not enabled in the protected view. The "protected view" is also vulnerable to social engineering tactics that encourage the user to exit the "protected view" to allegedly realize functionality of the active content, thus resulting in the execution of malicious active content. Thus, users may be unwittingly tricked into activating malicious active content despite such warnings.

While it may be beneficial to identify and prevent execution of only the active content that is known to pose malicious risks, in practice this is challenging and resource intensive and is still ineffective at identifying new forms of malicious content that has not yet been discovered as such. For example, common attempts to identify malicious content include screening incoming documents at a host computer or server based on a comparison with known malicious signatures. Such signature-based malware detection techniques, however, are incapable of identifying malicious active content for which a malicious signature has not yet been identified. Even known malicious active content can be slightly modified without much change in functionality thereby requiring a new signature to detect. Accordingly, it is generally not possible to identify new malicious content or subtle variations of existing malicious content using signature-based detection methods. Furthermore, in many cases, malicious active content is embedded in otherwise legitimate documents or files having proper structure and characteristics, and the malicious active content may also be disguised to hide the malicious nature of the active content, so that the malicious content appears to be innocuous. Thus, even upon inspection of a document according to known malware scanning techniques, it may be difficult to identify malicious active content.

Thus, there is a need for alternative techniques to mitigate the risks posed by malicious active content attacks without preventing the usability of embedded active content, and that also overcome at least some of the above disadvantages of known techniques.

SUMMARY

In the following description certain aspects and embodiments of the present disclosure will become evident. It should be understood that the disclosure, in its broadest sense, could be practiced without having one or more features of these aspects and embodiments. It should also be understood that these aspects and embodiments are examples only.

The disclosed embodiments include a method of disarming active content in a received input file in a computer system having a processor. The method includes steps for identifying from digital content of the input file, targeted active content associated with an automatically invoked subroutine, altering the automatically invoked subroutine to prevent automatic execution of the instructions associated with the subroutine upon rendering by a rendering application, such that functionality of the targeted active content is preserved, and configuring the input file to include a selectable feature enabling a user to invoke the targeted active content responsive to a user input, thereby creating a reconfigured input file.

The disclosed embodiments also include a method disarming targeted active content in a received input file in a computer system having a processor. The method includes steps for identifying from digital content of the input file, targeted active content associated with a predetermined function, altering an aspect of a call to the predetermined function to prevent the predetermined function of the targeted active content from being invoked, such that functionality of the targeted active content is preserved, and configuring the input file to include a selectable feature enabling a user to invoke the predetermined function responsive to a user input, thereby creating a reconfigured input file.

Another disclosed embodiment includes a system for disarming malicious code. The system comprises a memory device storing a set of instructions, and a processor configured to execute the set of instructions to perform a method according to the disclosed embodiments.

In accordance with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are by example and explanatory only, and are not restrictive of the disclosed embodiments, as claimed.

BRIEF DESCRIPTION OF THE DRAWINGS

The subject matter regarded as the invention is particularly pointed out and distinctly claimed in the concluding portion of the specification. The disclosed principles, however, both as to organization and method of operation, together with objects, features, and advantages thereof, may best be understood by reference to the following detailed description when read with the accompanying drawings in which:

Figure 1:
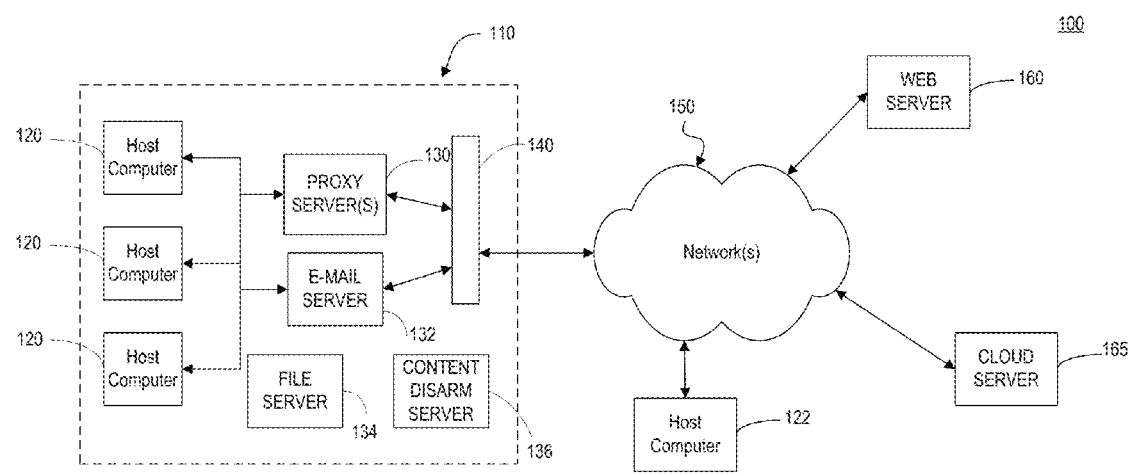
FIG. 1 is a schematic block diagram of an example computing environment consistent with the disclosed embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence. Additionally, some of the described embodiments or elements thereof can occur or be performed simultaneously, at the same point in time, or concurrently.

One technique hackers use to obtain control of a victim computer or computing environment is through the execution of malicious code at the victim computer or computing environment using active content embedded in an electronic document. Hackers commonly configure the active content to be automatically invoked when a document is rendered and executed automatically upon rendering the document, such as upon opening of a document, workbook, sheet, etc. Other types of malicious active content may be executed after rendering based on user interaction with the document. The disclosed embodiments provide solutions for mitigating the risks posed by malicious active content by disabling or disarming targeted instructions within the active content from being executed during rendering of a document, while preserving the functionality of the targeted instructions. Such targeted instructions within the active content may be referred to as targeted active content. And the targeted instructions within the active content may refer to any instructions included within the active content contained within the document or file or instructions referred to or called or caused to be executed by the active content.

Any targeted active content that is disabled or disarmed is prevented from carrying out its intended function automatically upon rendering, for example, or in a manner otherwise unknown to the user, such as being embedded within other active content that is invoked by the user during interaction with a document. Because the disclosed embodiments may disable or disarm targeted instructions within the active content without their intended functionality being destroyed, after the input content is rendered by a rendering application, a user may be enabled to manually or deliberately execute the targeted active content. Execution of the targeted active content may be performed by selection of a document feature, such as a button, icon, or link, or upon input of a particular keystroke. The example embodiments disarm the targeted active content in the input content itself, which is performed independent of application level configurations that may control how a user receives active content generally. Thus, a user may be enabled to fully interact with a document while protecting the user from malicious active content that may be included in the disabled targeted active content. Any targeted and disabled active content can be selectively and conveniently invoked by the user on a document by document basis using embedded content features to enjoy its intended benefits, overcoming at least some of the above-described limitations known in the art.

Active content, as this term is used throughout this disclosure, refers to any content embedded in a document that can configured to carry out an action or trigger an action, and includes common forms such as word processing and spreadsheet macros, formulas, scripts, etc., including JavaScript code embedded in PDF documents, for example, or any executable script or code. An action can include any executable operation performed within or initiated or enabled by the rendering application. Active content is distinct from other "passive content" that is rendered by the application to form the document itself. The disclosed techniques include altering any targeted active content embedded in received content to prevent automatic execution or other execution unknown to a user, yet preserving the targeted active content without modification (although some modification may be performed under certain circumstances) and enabling a user to selectively invoke the targeted, disabled active content. In some embodiments, as described in greater detail below, targeted active content may include automatically invoked active content that may be identified by a known automatically-invoked subroutine, for example. In the disclosed embodiments, the automatically invoked subroutine of the targeted active content may be renamed so that it is not automatically invoked by the rendering application. In other embodiments, a call to a targeted active content function may be renamed so the function is not automatically invoked or otherwise invoked unknowingly to the user. In other embodiments targeted active content may be "wrapped" in protective active content that may require selective user input to invoke the targeted active content. In some embodiments, additional features or elements, or functionality may be added to a document to enable a user to selectively invoke the targeted and disarmed or disabled active content by using the additional document features or by inputting a keystroke, for example.

The present disclosure describes, among other things, example processes for preventing execution of targeted active content automatically or otherwise in a manner unknown to the user. The example processes thereby aim to disarm (e.g., prevent, affect, or disrupt) certain malicious attacks caused by targeted active content embedded in the received input document, file or input content. The disclosed embodiments, therefore, provide improved functionality for mitigating the risks of active content while enhancing convenience and usability of active content that may be beneficial to an enterprise, thus overcoming known disadvantages in the art.

The disclosed embodiments may be provided as part of a data sanitization or CDR process for sanitizing or modifying electronic content received at a computer or a computing system. The disclosed embodiments for mitigating risks associated with active content may be one of several CDR techniques applied to received content based on the type of content, for example, or other factors. Other CDR techniques that may be implemented together with the disclosed embodiments include document reformatting or document layout reconstruction techniques, such as those disclosed in U.S. Pat. No. 9,047,293, for example, the content of which is expressly incorporated herein by reference, as well as the altering of digital content techniques of copending U.S. patent application Ser. Nos. 15/441,860 and 15/441,904, filed Feb. 24, 2017, the contents of which are also expressly incorporated herein by reference.

The disclosed embodiments may be implemented with respect to any and all active content identified in a document, file, or other received or input content, without regard to whether the active content or the document itself is deemed suspicious in advance or before the sanitization is performed. Suspicious content may or may not include malicious active content. Suspicious content refers, for example, to a situation where input content may potentially or more likely include malicious active content, such as when the received content comes from or is associated with an untrusted source. Content may be deemed suspicious based on one or more characteristics of the received input content itself or the manner in which it is received, as well as other factors that alone or together may cause suspicion. One example of a characteristic associated with the input content refers to an authorship property associated with the input content. For example, the property may identify an author of the input content and the system determines whether the author property matches the source from which the input content was received and if there is no match then the system marks the input content as suspicious.

According to an example embodiment, any malicious active content (known or otherwise) included in input content received by a computer system may be disarmed or rendered at least temporarily inactive for its intended malicious purpose without applying a malware detection algorithm to the input content. That is, it is not necessary to first detect any malicious or suspicious active content in the input content in order to disarm the malicious active content. In some embodiments, one or more malware detection techniques may be implemented together with the exemplary embodiments, but knowledge or awareness of suspected malicious or suspicious active content is not required to disarm any malicious active content that may be included in the input content.

Although example embodiments need not first detect suspicious received content or any suspicious active content embedded in the received content, in some embodiments, upon identifying suspicious or malicious content, the disclosed processes are performed for any active content or for targeted instructions within the active content embedded in input content. Additionally, in some embodiments, if malicious active content is identified, the example embodiments may include functionality for destroying such active content that is known to be malicious, in lieu of the disclosed disarming processes. In some embodiments, any received content determined to include malicious content may be quarantined or blocked, so as not to be accessed by the intended recipient altogether.

The example embodiments may also include one or more policies instructing how received content and any active content embedded in the received content is to be processed for suspicious or malicious active content based on a number of known factors, some of which may be enterprise specific. Thus, the example embodiments for disarming active content are not limited to any particular enterprise computing environment or implementation, and can be implemented as a standalone solution or a suite of solutions, and can be customized according to preferences of a computing environment.

Received content or input content according to the disclosed embodiments may include any form of electronic content, including a file, document, an e-mail, etc., or other objects that may be run, processed, opened or executed by an application or operating system of the victim computer or computing device. Active content can be embedded among seemingly legitimate received content or input content. A file including embedded or encoded active content may be an input file or document that is accessed by a computing system by any number of means, such as by importing locally via an external storage device, downloading or otherwise receiving from a remote webserver, file server, or content server, for example, or from receiving as an e-mail or via e-mail or any other means for accessing or receiving a file or file-like input content. An input file may be a file received or requested by a user of a computing system or other files accessed by processes or other applications executed on a computing system that may not necessarily be received or requested by a user of the computing system. An input file according to the disclosed embodiments may include any file or file-like content, such as an embedded object or script, that is processed, run, opened or executed by an application or operating system of a computing system. Input content may include electronic mail, for example, or streamed content or other content. Thus, while some embodiments of the present disclosure refer to an input file or document, the disclosed techniques are also applicable to objects within or embedded in an input file or to input content generally, without consideration as to whether it can be characterized as a file, document, or object.

Reference is now made to FIG. 1, which is a block diagram of an example computing environment 100, consistent with example embodiments of the present disclosure. As shown, system 100 may include a plurality of computing systems interconnected via one or more networks 150. A first network 110 may be configured as a private network. The first network 110 may include a plurality of host computers 120, one or more proxy servers 130, one or more e-mail servers 132, one or more file servers 134, a content disarm server 136, and a firewall 140. Any of proxy server 130, e-mail server 132, or firewall 140 may be considered an edge network device that interfaces with a second network, such as network 150. Host computers 120 and other computing devices of first network 110 may be capable of communicating with one or more web servers 160, cloud servers and other host computers 122 via one or more additional networks 150.

Networks 110 and 150 may comprise any type of computer networking arrangement used to exchange data among a plurality of computing components and systems. Network 110 may include a single local area network, or a plurality of distributed interconnected networks and may be associated with a firm or organization. The interconnected computing systems of network 110 may be within a single building, for example, or distributed throughout the United States and globally. Network 110, thus, may include one or more private data networks, a virtual private network using a public network, one or more LANs or WANs, and/or any other suitable combination of one or more types of networks, secured or unsecured.

Network(s) 150, likewise may comprise any type of computer networking arrangement for facilitating communication between devices of the first network 110 and other distributed computing components such as web servers 160, cloud servers 165, or other host computers 122. Web servers 160 and cloud servers 165 may include any configuration of one or more servers or server systems interconnected with network 150 for facilitating communications and transmission of content or other data to the plurality of computing systems interconnected via network 150. In some embodiments, cloud servers 165 may include any configuration of one or more servers or server systems providing content or other data specifically for the computing components of network 110. Network 150 may include the Internet, a private data network, a virtual private network using a public network, a Wi-Fi network, a LAN or WAN network, and/or other suitable connections that may enable information exchange among various components of system 100. Network 150 may also include a public switched telephone network ("PSTN") and/or a wireless cellular network.

Host computers 120 and 122 may include any type of computing system configured for communicating within network 110 and/or network 150. Host computers 120, 122 may include, for example, a desktop computer, laptop computer, tablet, smartphone and any other network connected device such as a server, server system, printer, as well as other networking components.

File server 134 may include one or more file servers, which may refer to any type of computing component or system for managing files and other data for network 110. In some embodiments, file server 134 may include a storage area network comprising one or more servers or databases, or other configurations known in the art.

Content disarm server 136 may include one or more dedicated servers or server systems or other computing components or systems for performing aspects of the example processes for disarming active content. Content disarm server 136 may be provided as part of network 110, as shown, or may be accessible to other computing components of network 110 via network 150, for example. In some embodiments, some or all of the functionality attributed to content disarm server 136 may be performed in a host computer 120. Content disarm server 136 may be in communication with any of the computing components of first network 110, and may function as an intermediary system to receive input content or an input file from proxy server 130, e-mail server 132, file server 134, host computer 120, or firewall 140 and return, forward, or store a modified input file or modified content according to the example embodiments. Content disarm server 136 may also be configured to perform one or more malware detection algorithms, such as a signature-based malware detection algorithm, or other known behavior-based algorithms or techniques for detecting malicious activity in a "sandbox," for example. In some embodiments, one or more malware detection algorithms may be implemented together with the disclosed techniques to detect any malicious active content included in input content. For example, one or more malware detection algorithms may be implemented to first screen input content for known malicious active content, whereby the example embodiments are implemented to disarm any active included in the input content that may not have been detected by the one or more malware detection algorithms. Likewise, content disarm server 136 may also be configured to perform one or more algorithms on received input content for identifying suspicious content.

In some embodiments, content disarm server 136 and or file server 134 may include a dedicated repository for storing input content received by content disarm server 136. The dedicated repository may be restricted from general access by users or computers of network 110. In some embodiments, all or select input content may be stored for a predetermined period of time or according to a policy of a network administrator, for example.

Proxy server 130 may include one or more proxy servers, which may refer to any type of computing component or system for handling communication requests between one or more interconnected computing devices of network 110. In some embodiments, proxy server 130 may be configured as one or more edge servers positioned between a private network of first network 110, for example, and public network 150.

E-mail server 132 may include one or more e-mail servers, which may refer to any type of computing component or system for handling electronic mail communications between one or more interconnected computing devices of network 110 and other devices external to network 110. In some embodiments, e-mail server 132 may be configured as one or more edge servers positioned between a private network of first network 110, for example, and public network 150.

First network 110 may also include one or more firewalls 140, implemented according to any known firewall configuration for controlling communication traffic between first network 110 and network 150. In some embodiments, firewall 140 may include an edge firewall configured to filter communications entering and leaving first network 110. Firewall 140 may be positioned between network 150 and one or more of proxy server 130 and e-mail server 132. In the embodiment shown, proxy server 130, e-mail server 132 and firewall 140 are positioned within first network 110, however, other configurations of network 110 are contemplated by the present disclosure. For example, in another embodiment, one or more of the proxy server 130, e-mail server 132 and firewall 140 may be provided external to the first network 110. Any other suitable arrangement is also contemplated. Additionally, other networking components, not shown, may be implemented as part of first network 110 or external to network 110 for facilitating communications within the first network 110 and with other external networks, such as network 150.

As described in greater detail below, the processes of the example embodiments may be implemented at any one of the computing devices or systems shown in FIG. 1, including host computer 120, 122, proxy server 130, e-mail server 132, file server 134, content disarm server 136, firewall 140, and cloud server 165.

Figure 2:
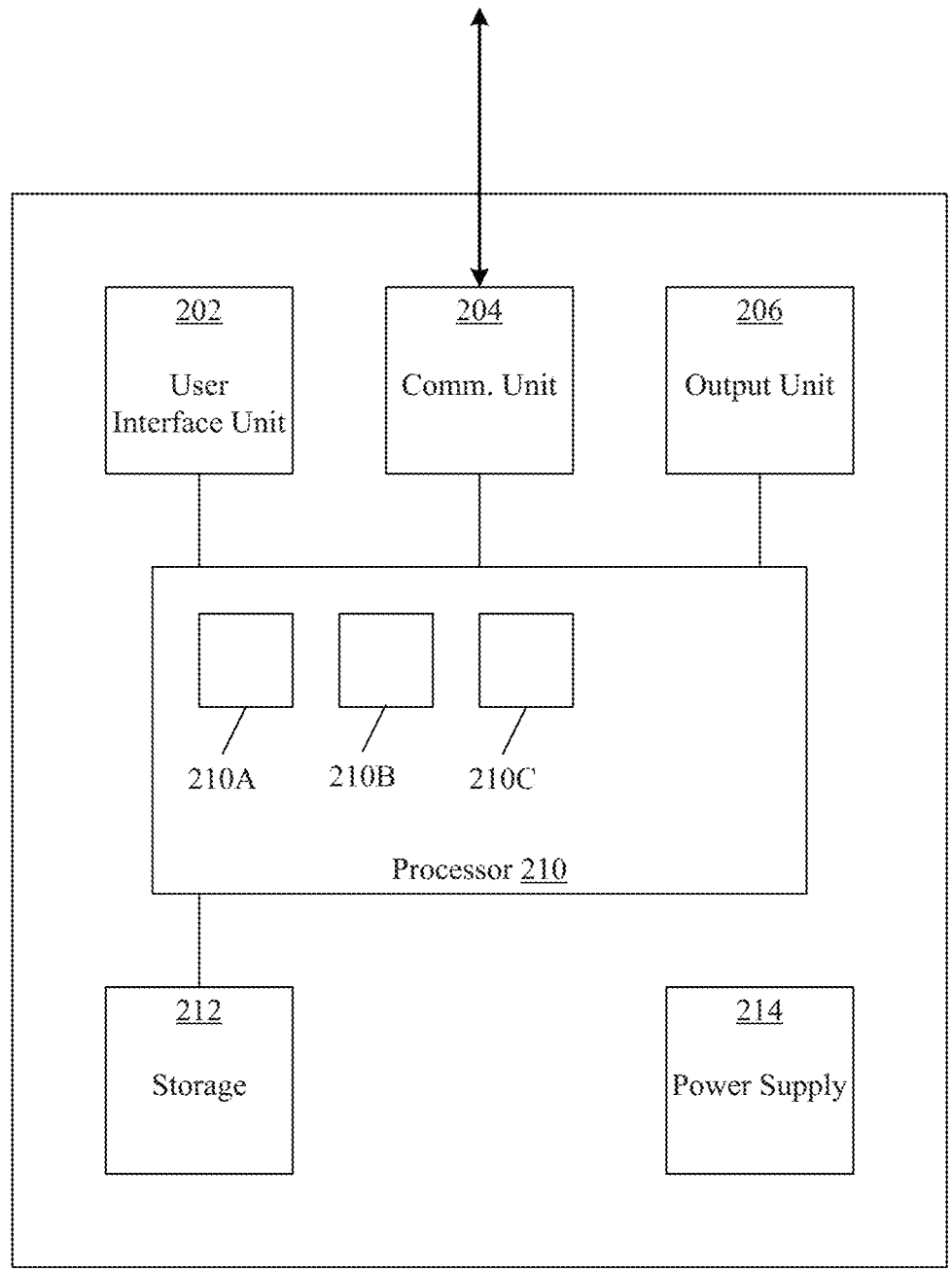
FIG. 2 is a schematic block diagram of an example computing system adapted to perform aspects of the disclosed embodiments.

Reference is now made to FIG. 2, which is a schematic block diagram of an example computing system 200 adapted to perform aspects of the disclosed embodiments. According to the example embodiments, computing system 200 may be embodied in one or more computing components of computing environment 100. For example, computing system 200 may be provided as part of host computer 120,122, proxy server 130, e-mail server 132, file server 134, content disarm server 136 or cloud server 165, for example. In some embodiments, computing system 200 may not include each element or unit depicted in FIG. 2. Additionally, one of ordinary skill in the art would understand that the elements or units depicted in FIG. 2 are examples only and a computing system according to the example embodiments may include additional or alternative elements than those shown.

Computing system 200 may include a controller or processor 210, a user interface unit 202, communication unit 104, output unit 206, storage unit 212 and power supply 214. Controller/processor 210 may be, for example, a central processing unit processor (CPU), a chip or any suitable computing or computational device. Controller/processor 210 may be programmed or otherwise configured to carry out aspects of the disclosed embodiments.

Controller/processor 210 may include a memory unit 210A, which may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory unit 210A may be or may include a plurality of, possibly different memory units. Memory 210A may be a computer or processor non-transitory readable medium, or a computer non-transitory storage medium, e.g., a RAM.

Controller/processor 210 may further comprise executable code 210B which may be any executable code, e.g., an application, a program, a process, task or script. Executable code 210B may be executed by controller 210 possibly under control of operating system 210C. For example, executable code 210B may be an application that when operating performs one or more aspects of the example embodiments. Executable code 210B may also include one or more applications configured to render input content, so as to open, read, edit, and otherwise interact with the rendered content. Examples of a rendering application include one of various Microsoft® Office® suite of applications, a PDF reader application or any other conventional application for opening conventional electronic documents.

User interface unit 202 may be any interface enabling a user to control, tune and monitor the operation of computing system 200, including a keyboard, touch screen, pointing device, screen, audio device such as loudspeaker or earphones.

Communication unit 204 may be any communication supporting unit for communicating across a network that enables transferring, i.e. transmitting and receiving, digital and/or analog data, including communicating over wired and/or wireless communication channels according to any known format. Communication unit 204 may include one or more interfaces known in the art for communicating via local (e.g., first network 110) or remote networks (e.g., network 150) and or for transmitting or receiving data via an external, connectable storage element or storage medium.

Output unit 206 may be any visual and/or aural output device adapted to present user-perceptible content to a user, such as media content. Output unit 206 may be configured to, for example, display images embodied in image files, to play audio embodied in audio files and present and play video embodied in video files. Output unit 206 may comprise a screen, projector, personal projector and the like, for presenting image and/or video content to a user. Output unit 206 may comprise a loudspeaker, earphone and other audio playing devices adapted to present audio content to a user.

Storage unit 212 may be or may include, for example, a hard disk drive, a floppy disk drive, a Compact Disk (CD) drive, a CD-Recordable (CD-R) drive, solid state drive (SSD), solid state (SD) card, a Blu-ray disk (BD), a universal serial bus (USB) device or other suitable removable and/or fixed storage unit. Data or content, including user-perceptible content may be stored in storage unit 212 and may be loaded from storage 212 into memory unit 210A where it may be processed by controller/processor 210. For example, memory 210A may be a non-volatile memory having the storage capacity of storage unit 212.

Power supply 214 may include one or more conventional elements for providing power to computing system 200 including an internal batter or unit for receiving power from an external power supply, as is understood by one of ordinary skill in the art.

Figure 3:
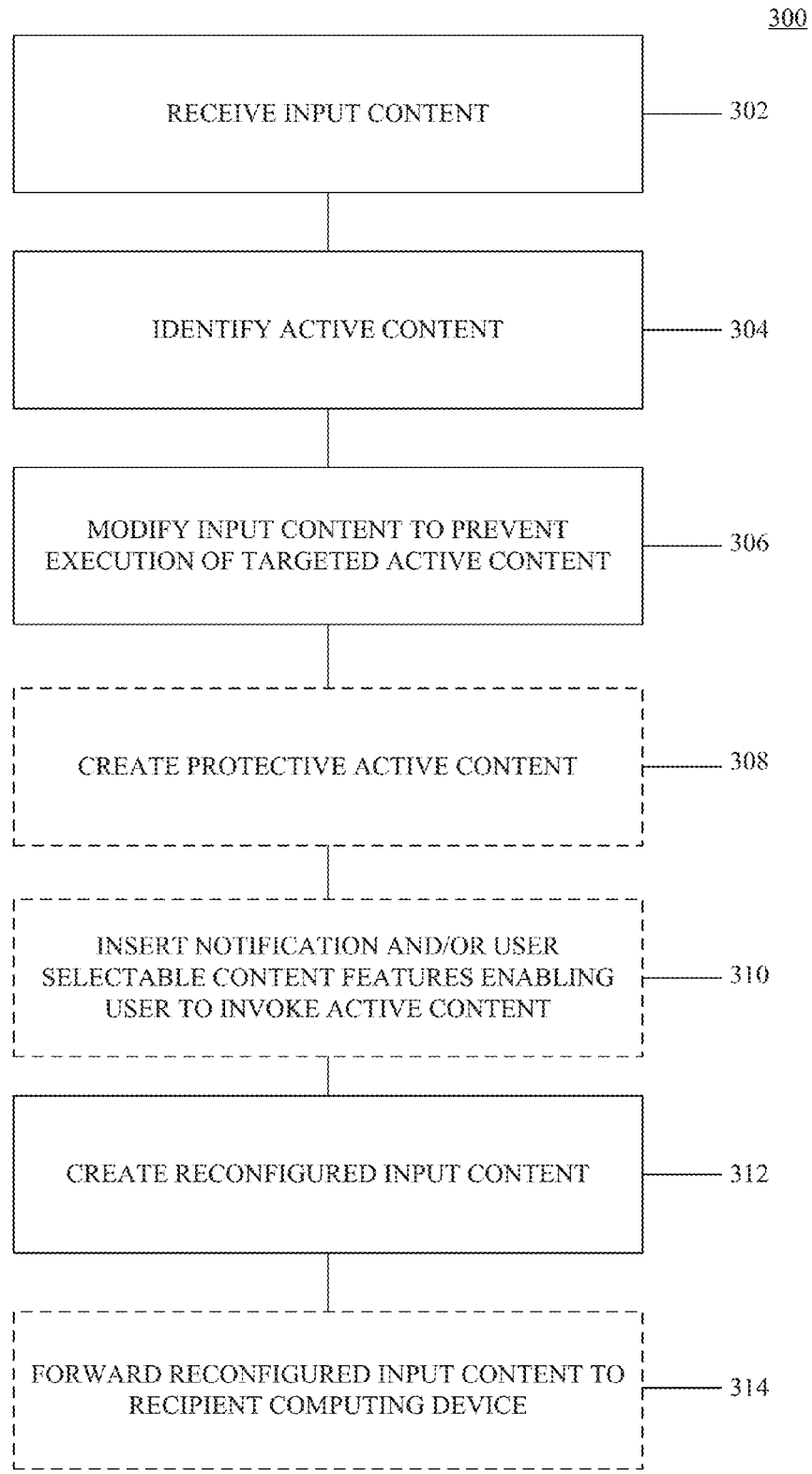
FIG. 3 is a flowchart of an example process for disarming active content, consistent with the disclosed embodiments.

Reference is now made to FIG. 3, which is a flowchart of an example process for disarming targeted active content in received input content, which in some embodiments may be included in an input file. According to the example embodiments, process 300 may be implemented to disarm targeted active content identified in the received content, suspicious or otherwise, thereby preventing the automatic execution of the targeted active content or other execution unknown to a user, while preserving the functionality of the targeted active content. Process 300 includes processing of the received input content to disarm targeted active content in the input content itself, thereby resulting in reconfigured input content for which the targeted active content is disarmed. The reconfigured input content is configured to be rendered by a user using a rendering application just as the received input content would be rendered by the user. The reconfigured input content may also be configured to enable the full functionality as the received input content with the exception of the capabilities of the disarmed targeted active content, which in some embodiments may be selectively invoked to provide the same functionality as the received input content.

At operation 302, input content may be received or accessed by a computing system, such as computing system 200, which may be included in any of the computing elements in computing environment 100, including host computer 120, 122, proxy server 130, e-mail server 132, file server 134, content disarm server 136 or cloud server 165, for example. In some embodiments, for example, the input content is received by a host computer 120, 122 that may be operated by an end-user. In other embodiments, the input content may be intended for host computer 120, 122 (or requested by host computer 120, 122) and is received by an intermediary computing system, such as proxy server 130, e-mail server 132, or firewall 140. In some embodiments, the input content may be received by a file server 134 or cloud server 165. Additionally, or alternatively, the input content may be received or accessed by content disarm server 136, from any of the computing components within network 110 or in communication with network 110.

The input content may be received or accessed by computing system 200 by any means known in the art, including such as by importing locally via an external storage device, downloading or otherwise receiving from a remote web-server, file server, or content server, for example, or by receiving via e-mail or any other means for accessing or receiving a file or file-like content.

According to some embodiments, one or more rules may be applied by the receiving computing system (or other intermediary computing system) to received input content or files according to known techniques for identifying trusted or potentially suspicious input files or otherwise suspicious content. For example, a preliminary analysis of an input file may include determining the source of the input file, the file type, file structure, the process accessing the file, or any other characteristics associated with the input file that may enable a determination as to a potential for an input file to include malicious active content or other malicious content, such as shellcode, for example. A preliminary analysis is optional, but in some embodiments it may be useful to first screen an input file for content or characteristics known or suspected to be associated with malicious content or activity or otherwise suspicious content. In the example embodiments, however, any targeted active content (malicious, suspicious, or otherwise) included in the input content can be disarmed without having first detected possible or suspected malicious or suspicious content. In some embodiments, the disclosed techniques may be performed when one or more malware detection techniques do not identify suspicious content or suspected malicious content in received input content. In some embodiments, received input content that is determined to include malicious content may be quarantined or otherwise blocked from being accessed by a user. Alternatively, in some embodiments, upon identifying suspicious or malicious content, the disclosed processes may be performed to disarm targeted active content that may be included in the input content. One or more other known content screening or analysis techniques and policies or rules for evaluating the input content may be implemented in addition to those expressly described in the example embodiments. The performance of particular aspects or operations of process 300 (as well as the other example processes) may be determined based on one or more policies or rules configured for computing system 200. For example, whether or not each step of process 300 is performed may be determined based on one or more policies or rules.

As part of operation 304, computing system 200 may execute a program or instructions or otherwise perform a process to identify any active content that may be included in the received input content. The input content may be in the form of an electronic document or file configured according to a structure of any known file type. The input content may include one or more data units arranged to form the input content. Most files and documents and at least some objects, for example, conform to a structure associated with an application(s) used to access them, as explained in U.S. Pat. No. 9,047,293, the content of which is incorporated herein by reference. A format of a data unit of the input content and a layout of the data units, thus, may vary based on a particular file structure of the input content. Some examples of a data unit may include a record, a stream, a cell, a character, etc. A data unit need not refer to a basic data unit of a file structure and may correspond to higher level elements or groups of elements. A data unit may include portions of the payload or content of the input file, as well as portions corresponding to a header, metadata, instructions, active content, or other data ancillary to the payload of the input file.

As part of operation 304, computing system 200 reads, scans, or parses the data units of the input content to identify any active content that may embedded in the input content. Computing system 200, according to the example embodiments, may be configured to scan or parse the data units of the input content according to techniques known in the art. In some embodiments, the active content and its location within the received input content may be identified based on the file structure or other data associated with the input content. In other words, the inclusion of active content may be determined based on an understanding of the file structure of the input content. Thus, in some embodiments, operation 304 may include additional operations for determining a file type of the input content or other characteristics of the input content to aid in the identification of active content.

In an example embodiment, as part of operation 304, computing system 200 may also be configured to identify in the input content particular types of active content, particular instructions within the active content, or active content meeting predetermined characteristics. For example, when the received input content includes a spreadsheet or word processing document, computing system 200 may be configured to identify particular macros, subroutines, or other scripted functions included in the input content. Throughout the example embodiments, the terms macro, subroutine, and function are used interchangeably as examples of active content. No distinction between these terms is intended unless specifically stated. Computing system 200 may also be configured to identify macros having or enabling particular functionality, or including functions or instructions performing particular functionality. The particular functionality of macros or other active content may be determined based on a database of functions or subroutines that are frequently known to be used by hackers, or otherwise pose risks that may be exploited by a hacker, such as those subroutines that are automatically invoked, or those functions or instructions that enable suspicious activity. Some example functions and subroutines that may be identified are explained in detail below, with respect to FIGS. 4 and 5, and may include those macros or code that are automatically invoked as defined by a specification of a file type or other particular instructions, functions or subroutines known to be a target of hackers.

In some embodiments, computing system 200 according to one or more rules or policies may be able to identify "trusted" active content included in input content. In some embodiments certain active content may be designated as "trusted" even if it may otherwise be defined as targeted active content. Computing system 200 may identify "trusted" active content based on an overall determination of characteristics of the input content, such as the identity of a sender and recipient and other information associated with the input content that may be indicative of "trusted" content, including data based on information obtained by an enterprise learning algorithm for identifying targeted and trusted active content. In some embodiments, computing system 200 may include a whitelist of sorts identifying "trusted" active content. In some embodiments, active content may be designated as "trusted" based on a scan of the active content, such as using one or more known malware detection techniques including a behavioral analysis of the active content in a "sandbox" environment, for example. Such "trusted" active content may be added to a whitelist that computing system 200 may consult when parsing input content as part of operation to identify targeted active content. In some embodiments, such "trusted" active content may retroactively be enabled in input content from which it was previously disarmed, such as by replacing a reconfigured input file with the original input file, for example.

In some embodiments, the reading, scanning or parsing process is performed without invoking an execution engine such as application software of the computing system 200 for rendering the input content. For example, in the example embodiments, computing system 200 does not render the input content, as such rendering of input content may result in triggering execution of malicious active content or other malicious code. In an example embodiment, input content may include one or more input files or objects etc. In such an embodiment, each distinct file, object, or content of the received input content may be parsed one by one in separate iterative processes to identify any active content included in received input content.

As part of operation 306, computing system 200 may modify the received input content to disarm or prevent execution of the instructions associated with targeted active content. Instructions associated with targeted active content may include any instructions within a targeted function or subroutine, or other instructions or functions referenced to or called as a result of executing the targeted active content. In some embodiments, computing system 200 may modify one or more aspects of the targeted active content to prevent automatic execution of the targeted active content or other execution unknown to a user. Some example modifications of the targeted active content include renaming a particular aspect of the targeted active content, such as the subroutine name, so that it no longer corresponds to an automatically invoked subroutine, or renaming a function call so that it no longer calls a function that may be determined to pose risks to the computing environment. These examples are described in greater detail below with respect to FIGS. 4 and 5, however, other modifications are contemplated. For example, in some embodiments, instead of renaming an aspect of the targeted active content, the targeted active content may be wrapped in protective active content that may require selective input to invoke any targeted active content "wrapped" in the protective active content. In other example embodiments, the identified and targeted active content may be disarmed or modified according to any technique that prevents the execution of the targeted active content, including without any modification (functional or otherwise) of the targeted active content. In some example embodiments, the functionality of the targeted active content is thus preserved, such that a user may be enabled to manually or deliberately invoke the targeted/disabled instructions associated with the active content. Thus, in the example embodiments, the disarmed instructions within the targeted active content can still be made functional or invoked upon a deliberate action taken by a user.

In some embodiments, it may be determined that one or more aspects of the identified active content is protected. For example, some portions of the active content may be encrypted or password protected. Thus, in some embodiments, as part of operation 306, computing system 200 may be configured to determine a password or key for unprotecting those portions of the active content to identify any targeted active content within those protected portions. A password or key may be obtained from the intended recipient of the input content or may be accessed from a database storing such credentials in association with an identifier of the intended recipient or sender, for example. In some embodiments, computing system 200 may be configured to determine a password or key based on an algorithm, for example, or one or more other data associated with the input content, such as a hint or clue associated with the input content or otherwise obtained from the input content.

In some embodiments, whether or not a user is enabled to invoke targeted and disarmed active content may depend upon one or more rules or policies established for an enterprise network 110, for example. The rules may be based on one or more of a sender's identity, recipient's identity, input content type, active content type, etc. Thus, a policy may be configured to enable only certain users with the capability to invoke disarmed targeted active content. A rule may also enable those users to invoke targeted active content only from trusted senders, or senders within or associated with the enterprise network 110, for example. A policy may also determine that those users may only be able to invoke certain types of active content, certain types of targeted active content, or active content having certain functionality, or may be able to invoke only active content included in certain types of input content. Some targeted active content functions may be disarmed altogether according to one or more rules or policies. Thus, an enterprise administrator may be able to enforce one or more rules or policies of various permutations according to an enterprise's goals or needs.

Each of these numerous variations, and others, is contemplated by the disclosed embodiments. Based on a determination of one or more applicable policies or rules, operations 308, 310, and 312, may or may not be performed.

As part of optional operation 308, computing system 200 creates protective active content that is based on or associated with the identified targeted active content, which may be modified in operation 306. The protective active content may enable a user to selectively invoke the targeted and disabled active content. In some embodiments, the protective active content may include a macro or function that is configured to invoke the targeted and disabled active content upon a deliberate action taken by the user. The macro created as protective active content may include an automatically invoked subroutine that is itself automatically invoked upon rendering of the resulting reconfigured input content. A macro created as protective active content, therefore, may include functionality to invoke the original, now disarmed or modified, instructions within targeted active content upon satisfying some condition. The condition may be associated with a deliberate action taken by the user upon interacting with the rendered reconfigured input content generated by process 300. A deliberate action taken by the user may include selection of a document feature, such as a button, prompt, icon, link or other selectable feature, or based on user input of a keystroke, for example. The document feature may be inserted into the input content to be displayed upon rendering of the reconfigured input content by automatically invoking the protective active content, for example, or may otherwise by generated as a prompt, for example, based on a user's interaction with the reconfigured input content. Thus, in some embodiments, the created protective active content may include additional document features that enable the user to invoke the modified active content.

Figure 6:
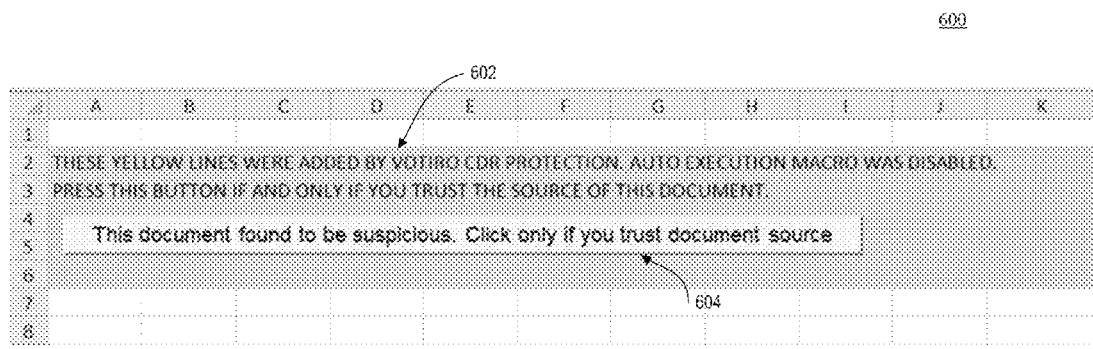
FIG. 6 is an example rendering of reconfigured input content, consistent with the disclosed embodiments.

As part of optional operation 310, additional content features may be inserted into the input content such that it is displayed as part of the rendered reconfigured input content resulting from process 300. For example, as illustrated in FIG. 6, an example portion of rendered reconfigured input content 600 may include additional document features, such as a notification feature 602 and a user selectable content feature 604. The additional content features may include elements inserted into the document itself, or alternatively, may be displayed upon a rendering application's execution of the protective active content created in operation 308.

Notification feature 602 may be provided as a type of header or banner in the rendered reconfigured input content 600, as shown in the example spreadsheet document, or it may be provided in other similar forms, such as a watermark or text box, for example, and may be positioned at various locations in the rendered reconfigured input content, together with or apart from selectable content feature 604. Notification feature 602 may also be provided in various forms such as a predetermined image, graphic, or customizable and editable text in a text box, for example, or various other forms that may depend on a type of the input content and or a structure or layout of the input content as it would be rendered by a rendering application.

Notification feature 602 may provide various notifications, dynamically determined or predetermined, which may depend on a rule or policy of the network 110 and the nature of any targeted active content identified in operation 304. For example, as shown, notification feature 602 may include a notice that the document is protected and that an "auto execution macro was disabled." Thus, in the illustrated example, upon performing operation 304, computing system 200 identified targeted active content included in the document in the form of a macro and the macro was determined to be of a form that is automatically executed, either upon opening the document or opening a workbook associated with the document, for example. In some embodiments, a message may be generated that is tailored to the particular nature of the targeted active content that is disabled. For example, in some embodiments, a generated message may include information about the disabled instruction(s) within the targeted active content, such as a description of the functionality of the disabled targeted active content that may be determined from other data associated with the active content. Any other information that may aid in a user's determination to invoke the disabled targeted active content may be provided.

In the illustrated example, the automatically executed macro was modified in operation 306 to disarm the macro and prevent its automatic execution, without destroying its functionality. The macro may have been disarmed according to the example processes described with respect to FIG. 4 below. In the example illustrated in FIG. 6, the intended recipient of the input content is enabled to selectively invoke the disarmed macro upon rendering the reconfigured input content. Whether or not the intended recipient is provided with this functionality in the reconfigured input content may have been determined by the computing system 200 based on one or more rules. Thus, a system administrator may decide when, whether, or for what types of input content or targeted active content the intended recipient is to be provided with a selectable content feature 604 or similar capabilities for invoking any targeted and disarmed active content. In the illustrated example, the user may invoke the disarmed or disabled macro upon selection of selectable content feature 604 in the rendered reconfigured input content 600. The selectable content feature 604 may be associated with protective active content created in operation 308, such that upon selection of content feature 604, the original active content (e.g., the identified auto execution macro) is invoked to perform its original functionality. Selectable content feature 604 may include any feature selectable upon user input, such as a button, link, icon, etc. Selectable content feature 604 may also be associated with a keystroke, such that a user can selectively invoke the disarmed instructions within the targeted active content using the keystroke. Selectable content feature 604 may be associated or displayed together with notification feature 602 in the reconfigured input content. In the illustrated example, selectable content feature 604 itself includes a notification warning the user to "click" only if the source of the document is trusted. Selectable content feature 604 may also include an instruction of a keystroke configured to invoke the disabled targeted active content. Other messages may be provided based on characteristics of the input content or the sender, receiver, etc.

In some embodiments, notification feature 602 and selectable content feature 604 may be merged to provide a single selectable notification. In other embodiments, only a notification feature 602 may be provided and the user may not be enabled to invoke the disabled targeted active content. The notification feature 602 may provide instructions to contact a system administrator, for example, if it is desired to invoke the disabled targeted active content. In some embodiments, notification feature 602 may be configured to prompt a system administrator, such as via an electronic message, to notify the administrator of a desire to invoke the disabled targeted active content. In some embodiments, the additional content features may be provided as part of the document to be displayed upon rendering the document, such as in the example illustrated in FIG. 6, and in other embodiments, an additional content feature may be displayed in response to a user interaction with the document, such as upon a call to a function based on a user's interaction with the document. Other configurations and variations of the additional content features are contemplated.

As part of operation 312, reconfigured input content is created from the received input content. In some embodiments, the reconfigured input content is created as a new file or document or email, distinct from the received input content. In some embodiments, the reconfigured input content includes the received input content as processed according to the operations of process 300. Thus, the created reconfigured input content may include any disabled active content as identified and targeted in operation 304 and modified or disabled in operation 306. Reconfigured input content may also include protective active content created in operation 308 and or additional content features, such as a notification feature or user selectable content feature inserted in operation 310. The reconfigured input content is configured to be rendered by a user using a rendering application just as the received input content would be rendered by the user. The reconfigured input content may also be configured to enable the full functionality as the received input content with the exception of the capabilities of the disarmed instructions within the targeted active content, which, as described above, may be selectively invoked by the user to provide the same functionality as the received input content.

In some embodiments, the reconfigured input content generated in operation 312 may include other changes to the received input content according to one or more CDR techniques for disarming other types of malicious attack vectors that may be presented in the received input content. That is, other than the disarmed targeted active content and other changes with respect to operations 306, 308, and 310, the resulting reconfigured input content may include other modifications to the input content according to one or more other techniques for disarming malicious content that may not be categorized as active content, such as encoded or embedded shellcode or other malicious or suspicious code. For example, in some embodiments, a reconfigured input file may be created to include modified payload content in place of the original payload by changing the values of the underlying payload data units of the input content, such as according to the techniques of U.S. Pat. No. 9,047,293 and U.S. patent application Ser. Nos. 15/441,860 and 15/441,904, the contents of which are expressly incorporated herein. In some embodiments, the reconfigured input content may include other structural changes to the received input content. For example, a header of a received input content or file may be changed in a reconfigured input content or file. A reconfigured input file may also be encoded or compressed or undergo any number of other changes to a structure, layout, or format of the input content, without preventing materially similar uses and functionality as the received input content.

As part of optional operation 314, the reconfigured input content or a reconfigured input file may be forwarded to a recipient computing device such as host computer 120, 122 or a file server 134 or other computing device of computing environment 100. Operation 314 may be performed in those embodiments where process 300 is performed by a computing device or system other than an intended recipient of the input content, for example. In embodiments where process 300 is performed at a host computer 120, 122, for example, operation 314 may not be performed. Additionally, in some embodiments, reconfigured input content may be forwarded to one or more other computing devices or systems intermediate or alternative to an intended recipient computing device. In the example embodiments, the reconfigured input content may be rendered at the recipient computing device to a human user using known rendering applications for interacting with the input content, or may otherwise be accessed, opened, processed, stored, etc. at the recipient computing device by the user or other process executing at the recipient computing device.

In some embodiments, each input file or each input file of a predetermined type, etc., or all input content or input content having certain characteristics that is received by a computing system 200 may be processed according to an example process 300, including those input files and input content that contain active content, without regard to the characteristics of the input files and input content, such as an identity of a sender or recipient. In some embodiments, one or more malware detection algorithms may first be applied to input content and process 300 is performed only if no suspicious or malicious active content is detected. This is advantageous because the example process 300 does not assume that any input content or embedded active content is safe or trusted, based on a preliminary analysis of the input file (if performed) or otherwise. This improves the likelihood of disarming malicious active content that may be included in the input content without knowledge by the sender.

In some embodiments, the originally received input content may be stored in a document repository, such as file server 134 or cloud server 165, or one or more other databases or storage systems and/or undergo additional processing for the determination of malicious input content whether passive or active. In some embodiments, the original received input content may undergo additional processing, automatically, periodically, or upon demand to determine the presence of malicious active content or other malicious content using one or more behavioral detection algorithms or other processes to determine the presence of malicious content in addition to any signature based detection techniques that may be implemented upon initial receipt of input content. Once created as a result of operation 312, the created reconfigured input content may be stored or indexed together with the original received input content in the document repository. By storing the original input content, an intended recipient may also be able to retrieve such original content and/or active content included in the original content at a later time if the original content is determined to be safe. For example, in some embodiments, identified and targeted aspects of active content of a particular character or functionality may have been removed from the input content according to one or more rules during process 300 or a user may have otherwise been prevented from invoking the targeted and disabled instructions within the active content. Upon request to an administrator, for example, the original content and the original active content may be obtained by a requesting user. In some embodiments, computing system 200 may be configured to automatically replace the reconfigured input content with the original content if the original content is determined to be safe. In some embodiments, once the original content is determined to be safe or "trusted", the original input content may be automatically forwarded to the intended recipient or the intended recipient may otherwise be notified that the original input content is accessible to the intended recipient.

Figure 4:
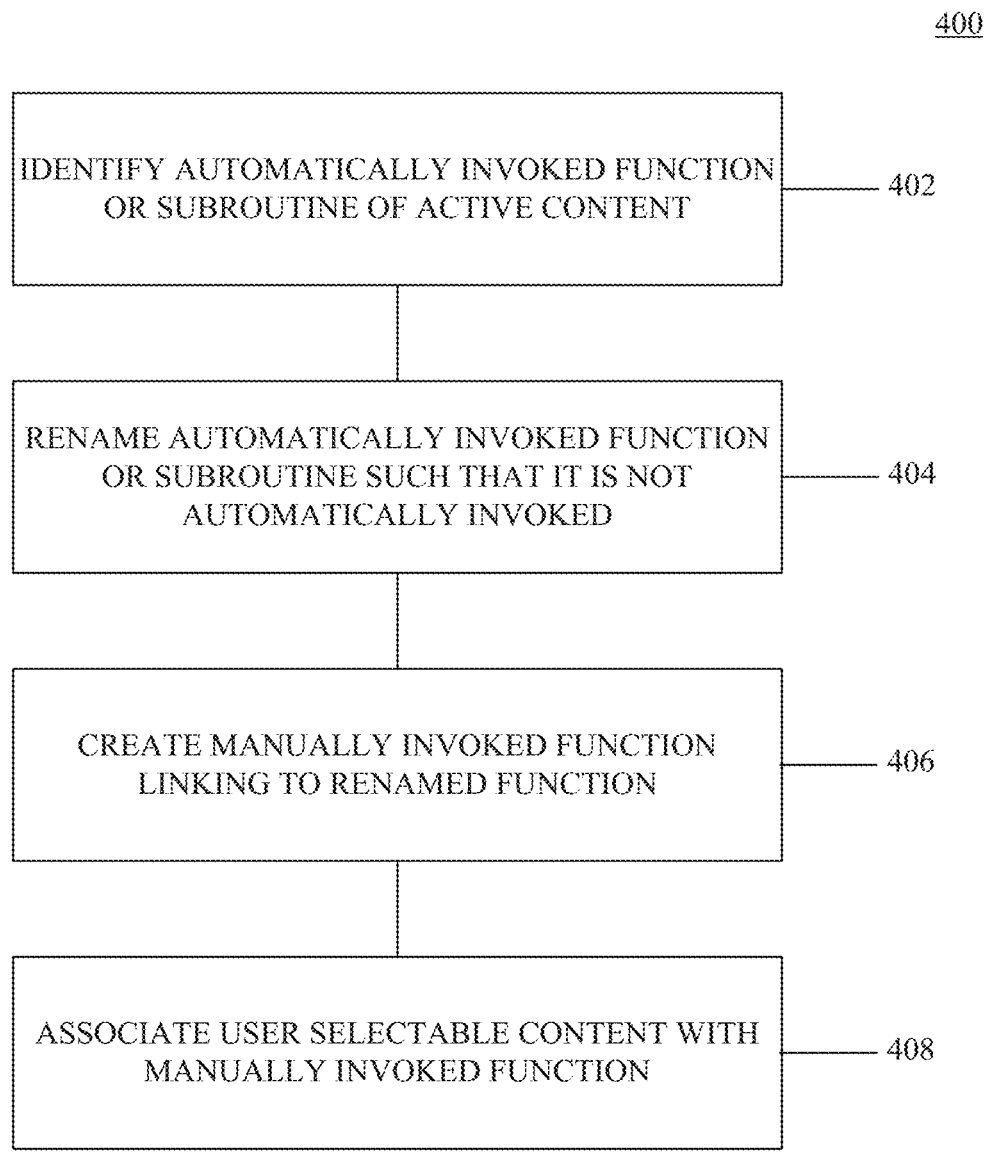
FIG. 4 is a flowchart of an example process for disarming automatically invoked active content, consistent with the disclosed embodiments.

Reference is now made to FIG. 4, which is a flowchart of an example process 400 for disarming targeted instructions within active content that are configured to be automatically invoked and executed in received input content upon rendering, such as an automatically executed macro, or a self invoked JavaScript function, for example. In this particular example, an auto execution macro may be invoked by a subroutine configured to be automatically executed by the document rendering application. Aspects of process 400 may be performed as part of process 300. For example, operation 402 for identifying targeted automatically invoked instructions within active content may be performed as part of or as a subprocess of operation 304. Additionally, operation 404 for renaming the automatically invoked function or subroutine may be performed as a subprocess of operation 306, and operations 406 and 408 may be performed as a subprocess of operation 308. Thus, the operations of process 400 pertain to only those aspects of a particular implementation when targeted active content that is automatically invoked is identified in operations 304/402.

As part of operation 402, computing system 200 may identify any automatically invoked functions or subroutines included in or as part of the active content. In some embodiments, the received input content may be scanned or parsed for any macros, subroutines, or functions or other processes that are configured to be invoked automatically by a rendering application. In some embodiments, the active content may be written or coded in Visual Basic for Applications (VBA), which is a common code implementation built into most Microsoft® Office® applications and is executed within the application to enable many specific and customizable features for controlling and interacting with the application and documents rendered by the application. VBA includes a library of automatically executed subroutines with a specific naming convention. Thus, in some embodiments, any automatically invoked instructions within active content may be identified based upon an inspection of the input content for any of the specifically named automatically executed subroutines. Some examples of automatically invoked VBA subroutines, include an Auto_Open( ) subroutine and Workbook_Open( ) subroutine. In some embodiments, the active content may also be written or coded in JavaScript, a code language commonly used to provide customizable functionality in PDF documents, for example. Similarly, any JavaScript code included in the input content can be reviewed to identify any automatically executed functions. Thus, in an example embodiment, computing system 200 may process the input content to identify any of the above-identified subroutines, as well as any other subroutines or functions known to be automatically invoked based on the configuration of the active content or the configuration of a rendering application.

As part of operation 404, computing system may rename the targeted automatically invoked function or subroutine with a predetermined naming convention that does not correspond to one of an automatically invoked VBA subroutine or function, for example. The predetermined naming convention may be any arbitrary name, but as an example, may include Auto_Open_Disabled( ) or Workbook_Open_Disabled( ). By renaming the targeted subroutine or function, the original targeted active content is no longer invoked automatically within the rendered application upon opening or rendering the reconfigured input content. Thus, any malicious active content included in an automatically invoked function or subroutine is not automatically invoked to take control of the victimized computing system, yet an intended recipient may be provided with otherwise full functionality of the rendered content within the rendering application.

Just as operation 308 of process 300 is optional, operations 406 and 408 are optional and may be performed when a user or intended recipient is to be provided with capability for invoking the disabled instructions within the targeted active content. As part of operation 406, protective active content in the form of a manually invoked function or macro may be created to "wrap" or link to the renamed function or subroutine that enables the targeted subroutine or function renamed in operation 404 to be invoked upon satisfaction of a condition. As an example, a new subroutine or function Votiro_Click( ) may be created to call the renamed subroutine or function upon receipt of a button click. In this example, new user selectable content, such as user selectable content feature 604 of FIG. 6, may be added to the input content and associated with the newly created subroutine Votiro_Click( ), as part of operation 408, for example. Thus, the newly created Votiro_Click( ) function or subroutine may be executed upon a user clicking on a content feature, such as user selectable content feature 604. Execution of the newly created function Votiro_Click( ) may result in execution of the original renamed active content. Example pseudocode of the manually invoked function generated as part of operation 406 may include the following, where Workbook_Open_Disabled( ) is the original subroutine that was renamed in operation 404:

Public Sub Votiro_Click( )
        Call ThisWorkbook.Workbook_Open_Disabled( )
    End Sub The operations of process 400 may be performed for each instance of targeted automatically invoked active content identified in the input content. Additionally, each targeted discrete subroutine or function identified in operation 402 may be renamed and "wrapped" or linked with a newly created manually invoked function, requiring user input to invoke each discrete subroutine or function, according to the example embodiments. In other embodiments, all disabled instructions within targeted active content may be invoked or enabled within a single newly created manually invoked function upon a single user input, for example. Additionally, groups of subroutines or functions may be wrapped together under a single newly created manually invoked function. Other variations are also contemplated.

Figure 5:
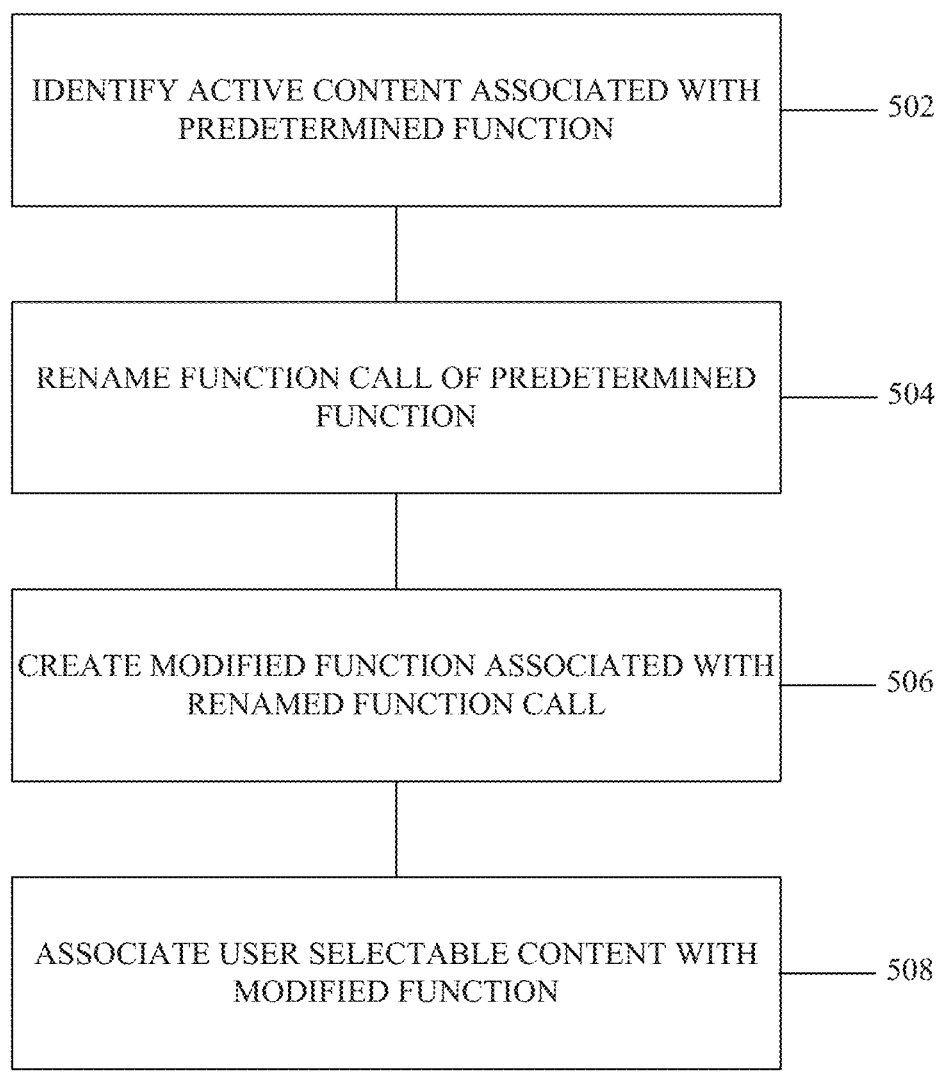
FIG. 5 is a flowchart of an example process for disarming active content associated with a predetermined function, consistent with the disclosed embodiments.

Reference is now made to FIG. 5, which is a flowchart of an example process 500 for disarming in the received input content any targeted active content associated with a predetermined function that may pose risks to a computing system, such that it may be used by a hacker to attack a computing environment. Aspects of process 500 may be performed as part of process 300. For example, operation 502 for identifying targeted active content associated with a predetermined function may be performed as part of or as a subprocess of operation 304. Additionally, operation 504 for renaming a function call of the predetermined function may be performed as a subprocess of operation 306, and operations 506 and 508 may be performed as a subprocess of operation 308. Process 500 may also be performed in addition to process 400. Thus, the operations of process 500 pertain to only those aspects of a particular implementation when targeted active content associated with a predetermined function is identified in operations 304/502.

As part of operation 502, computing system 200 may identify any targeted active content associated with a predetermined function call. In some embodiments, the received input content may be scanned or parsed to identify any instance of one or more calls to a predetermined function that an administrator of network 110 desires to disable. The predetermined functions may include any functions that may pose an inordinate risk to computing system 200 that may be attacked by a hacker. As described with respect to FIG. 4, in some embodiments, the active content may be written in VBA code, which includes a library of predefined functions with a specific naming convention. Thus, in some embodiments, active content associated with a predetermined function may be identified based upon an inspection of the input content for a call to any of the specifically named predetermined functions. An example of a predetermined function that is known to be a tool used by hackers includes the predefined Shell( ) function, which can be used to execute an external process or command outside the rendering application to run any arbitrary code as the attacker wishes. This is an example of a VBA function that may pose inordinate risks to the computing environment and is thus desired to be disabled. In other embodiments, the active content may be written in JavaScript code, which can similarly be inspected for an instance of one or more predetermined functions or predetermined functionality. The one or more predetermined functions may be included in a database of functions known or suspected to be used by hackers. One example of such a predetermined function includes eval( ), which evaluates or executes an argument, such as by interpreting the argument as code and running it. This function allows for calling code that can be fetched from an external server, inner PDF elements, or any other source that is difficult to inspect safely before execution. Thus, in an example embodiment, computing system 200 may process the input content to identify any call to the Shell( ) function, or eval( ) function, as well as any number of other predetermined functions.

As part of operation 504, when a call to a predetermined function is identified, computing system 200 may rename the call to the predetermined function, such that the predetermined function is no longer called (e.g., disabled) by a rendering application. The function call may be renamed to any arbitrary name, but as an example, may include Shell_Disabled( ). By renaming the function call, the original functionality of the targeted active content is no longer invoked by the Shell( ) function. Thus, any malicious activity intended to be performed by the Shell( ) function is prevented from execution. But, by renaming the function call as opposed to eliminating the function call, the functionality of the original active content may still be selectively enabled or invoked, if desired.

Just as operation 308 of process 300 is optional, operations 506 and 508 are optional and may be performed when a user is to be provided with capability for invoking the original (now disabled) within the targeted active content. As part of operation 506, protective active content in the form of a modified function may be created that is associated with the renamed function call. The modified function may encompass or wrap the original function call so as to call the original function only upon satisfaction of a condition, such as a user input. As an example, the newly created modified function may be defined having the name of the renamed function, such as Shell_Disabled( ), such that instead of a rendering application calling the predefined Shell( ) function, the newly created protective Shell_Disabled( ) function is called instead. The protective Shell_Disabled( ) function may be configured to perform functionality to then call the original Shell( ) function upon receipt of a button click or other selective user input. In this example, new user selectable content, similar to user selectable content feature 604 of FIG. 6, may be associated with the protective newly created modified function, as part of operation 508. The new user selectable content may be displayed upon execution of the protective Shell_Disabled( ) function and upon receipt of a button click, the original Shell( ) function is called to perform the functionality of the original targeted active content. Example pseudocode of the protective modified function generated as part of operation 506 may include the following, where Shell_Disabled( ) is the original function call renamed in operation 504:

```
Shell_Disabled( )
    approved=Prompt("You are about to execute unsafe
        command. Are you sure?")
    if (approved)
        Call Shell( )
End ( )
```

The operations of process 500 may be performed for each instance a function call to a predetermined function is identified in operation 502. And where active content associated with a predetermined function is included as part of an automatically invoked subroutine, the operations of process 500 may be nested within process 400. In this embodiment, the automatically invoked subroutine may be disabled as well as any predetermined function within the subroutine. Thus, a user may first be required to select a first content feature for invoking automatically executed active content, as described with respect to FIGS. 3 and 4, as well as second content feature for calling the predetermined function within the automatically executed active content, as described with respect to FIG. 5.

The foregoing description describes example embodiments for disarming targeted instructions within active content while preserving the functionality of the active content such that it may be selectively invoked by a user based on an interaction with the document. Any of the several techniques may be combined in any one embodiment depending on the nature of the input content, the nature of the active content, and one or more network rules or policies, for example. In the example illustrated in FIG. 6, received input content is in the form of a spreadsheet, but the example processes may be performed for other types of input content, including word processing documents, .pdf documents, etc. Upon performing aspects of process 300, 400, and or 500, computing system 200 created reconfigured input content 600 for which any identified targeted active content included in the spreadsheet input content is disabled according to any one or more of the example techniques before enabling access to an intended recipient. The reconfigured input content 600 includes additional document features that upon opening by the intended recipient, are rendered by a rendering application thereby providing a notification (e.g., notification feature 602) to the user that identified active content has been disarmed. The user, upon interacting with the document, may at any time determine whether to enable the disabled targeted active content, which may be performed by selecting a button (e.g., selectable content feature 604). Upon selection of the selectable content feature 604, the disarmed active content may be invoked to perform the originally intended functionality of the targeted active content. The example embodiments therefore enable a user to selectively invoke active content after interacting with the document, which may aid the user in determining whether the targeted active content should be invoked, thus providing advantages over other techniques.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. Thus, while certain features of the example embodiments have been illustrated and described herein, many modifications, substitutions, changes, and equivalents will be apparent to those of ordinary skill in the art. It is, therefore, to be understood that the appended claims are intended to cover all such modifications and changes as fall within the true spirit of the invention.

The claims are to be interpreted broadly based on the language used in the claims and not limited to examples described in the present specification, which are non-exclusive. For example, aspects of the disclosed embodiments are described as operations performed by a computing system, and one skilled in the art will appreciate that these aspects can be configured as a set of instructions stored on and executed from many types of tangible computer-readable media, such as secondary storage devices, like hard disks, floppy disks, or CD-ROM, or other forms of RAM or ROM.

What is claimed is:

1. A method of disarming targeted active content in a received input file in a computer system having a processor, the method comprising:
   identifying from digital content of the input file, targeted active content associated with an automatically invoked subroutine;
   altering the automatically invoked subroutine to prevent automatic execution of instructions associated with the subroutine upon rendering by a rendering application, wherein the altering includes renaming the subroutine to not correspond with an automatically invoked subroutine;
   creating protective active content associated with the renamed subroutine and configured to invoke the targeted active content responsive to receipt of a selection of a selectable feature; and
   configuring the input file to include the protective active content and the selectable feature, thereby creating a reconfigured input file.

2. The method of claim 1, wherein the automatically invoked subroutine includes an automatically invoked function.

3. The method of claim 1, wherein the automatically invoked subroutine is one of a predetermined function automatically invoked by a rendering application according to a specification of the targeted active content.

4. The method of claim 1, wherein the targeted active content includes programmable instructions executable by the rendering application.

5. The method of claim 4, wherein the targeted active content includes at least one of a word processing or spreadsheet macro, formula, or script, or programmable instructions embedded in the input file according to a portable document format.

6. The method of claim 1, wherein the protective active content is configured to generate the selectable feature that enables a user to invoke the targeted active content.

7. The method of claim 1, wherein the altering includes wrapping the subroutine within the protective active content.

8. The method of claim 1, further comprising inserting a notification feature into the digital content as part of the reconfigured input file, the notification feature being configured to provide an indication upon rendering of the reconfigured input file that targeted active content included in the input file has been disabled from automatically executing.

9. The method of claim 1, wherein the configuring the input file to include a selectable feature enabling a user to invoke the targeted active content responsive to a user input is performed according to a policy of the computer system based on one or more characteristics of the input file.

10. The method of claim 9, wherein the one or more characteristics of the input file include an identity of the sender and an identity of an intended recipient of the input file.

11. The method of claim 9, wherein, when the one or more characteristics of the input file are not consistent with a policy of the computer system, the method further comprises preventing functionality of the targeted active content.

12. The method of claim 1, wherein the reconfigured input file is a new file.

13. The method of claim 1, wherein the targeted active content associated with an automatically invoked subroutine includes a subroutine configured to be automatically invoked unknown to the user during interaction with the input file.

14. The method of claim 1, wherein the selectable feature includes a button, prompt, icon, or link, and wherein selection of the selectable feature includes a click or a keystroke.

15. A method of disarming targeted active content in a received input file in a computer system having a processor, the method comprising:
   identifying from digital content of the input file, targeted active content associated with a predetermined function;
   altering an aspect of a call to the predetermined function to prevent the predetermined function of the targeted active content from being invoked, wherein the altering includes renaming the function call;
   creating protective active content associated with the renamed function call and configured to invoke the targeted active content responsive to receipt of a selection of a selectable feature; and
   configuring the input file to include the protective active content and the selectable feature, thereby creating a reconfigured input file.

16. The method of claim 15, wherein the predetermined function is defined in a specification of the targeted active content.

17. The method of claim 16, wherein the predetermined function is associated with suspected malicious content.

18. The method of claim 15, wherein the protective active content is configured to generate the selectable feature.

19. The method of claim 15, wherein the protective active content is configured to cause display of a notification feature indicating that the predefined function has been disabled.

20. The method of claim 15, wherein the altering includes wrapping the call to the predetermined function within the protective active content.

* * * * *